United States Patent [19]

Kalman

[11] Patent Number: 4,654,151
[45] Date of Patent: Mar. 31, 1987

[54] PROCESS AND APPARATUS FOR FILTERING POLYMERS

[76] Inventor: Peter G. Kalman, 69, Hillway, Holly Lodge Estate, Highgate, London, England, N6 6AB

[21] Appl. No.: 762,340

[22] Filed: Aug. 5, 1985

[30] Foreign Application Priority Data

Jun. 13, 1985 [GB] United Kingdom ............... 8515013

[51] Int. Cl.[4] ..................... B01D 29/02; B01D 35/18; B01D 33/32
[52] U.S. Cl. .................................. 210/774; 210/780; 210/184; 210/401; 210/447
[58] Field of Search ............... 210/774, 184, 236, 447, 210/387, 401, 780; 425/197

[56] References Cited

U.S. PATENT DOCUMENTS

| | | | |
|---|---|---|---|
| 3,645,399 | 2/1972 | Kalman | 210/184 |
| 3,856,674 | 12/1974 | Kalman | 210/774 |
| 3,856,680 | 12/1974 | Elmore | 210/236 |
| 3,940,335 | 2/1976 | Kalman | 210/780 |
| 3,971,721 | 7/1976 | Fogarty, Jr. | 210/780 |
| 4,010,391 | 3/1977 | Kalman | 210/774 |
| 4,021,346 | 5/1977 | Berthiaume | 210/184 |

FOREIGN PATENT DOCUMENTS 1611132 4/1973 Fed. Rep. of Germany ...... 210/780

*Primary Examiner*—Benoît Castel
*Attorney, Agent, or Firm*—Silverman, Cass, Singer & Winburn, Ltd.

[57] ABSTRACT

A process and apparatus for filtering a polymer which passes through a heated, high pressure filtering chamber across which a filter members passes and in which sealing plugs made of the substance being filtered are formed within entry and exit zones thereof. A plug removal zone is provided between the entry port for said filter and the outflow aperture of the filtering chamber. The zone is provided with a valve to permit removal of sealing plug material when in a heat-softened state. A cooled, substantially rigid plug of polymer is formed initially. Thereafter, the plug is heated at one end to soften it and to permit displacement of a part of it through the valve by fresh, hot polymer. In alternative embodiments, the plug removal zone is not needed and the plug is permitted to pass into the passage but is then diverted before meeting the main flow of substance being filtered. In some cases, bleeding is not carried out but the plug is heated in the inlet port to melt it and provide melt homogeneity when the substance joins the substance being filtered.

26 Claims, 7 Drawing Figures

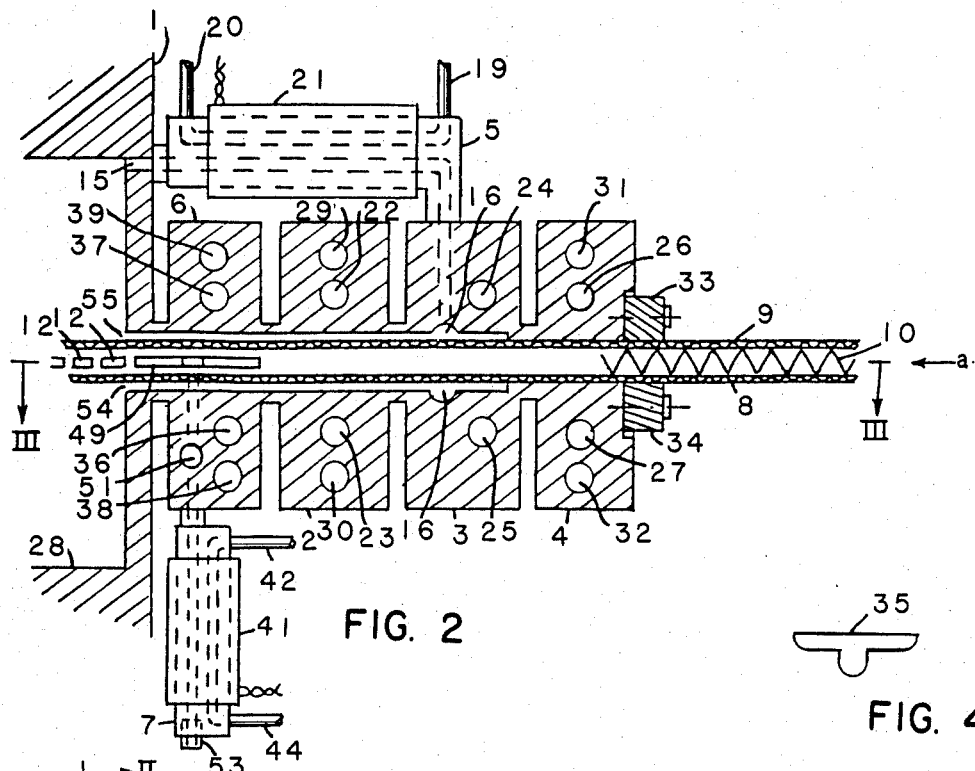
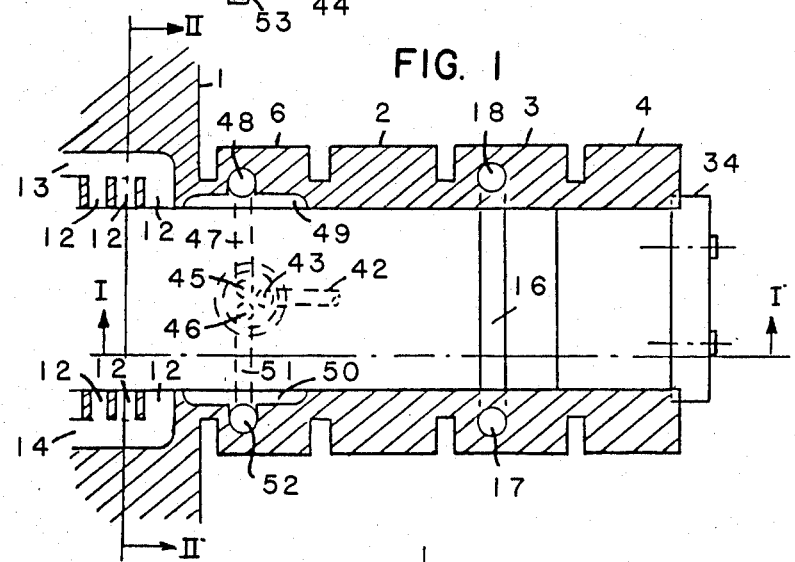
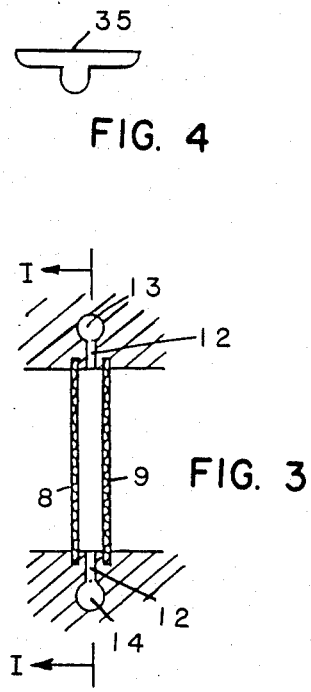
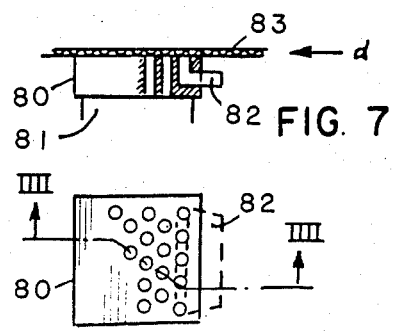

PROCESS AND APPARATUS FOR FILTERING POLYMERS

BACKGROUND OF THE INVENTION

1. Field of the Invention

This invention relates generally to polymer filtering equipment, and more particulary, to such equipment having structure to permit removal of seal material before it can enter the flow of filtered material leaving the equipment.

2. Description of the Prior Art

It is known in the art of filtering of polymers to employ one or more continuous filters passing through a heated, high pressure filtering chamber and to utilize at the filter entry and exit zones of such a chamber sealing plugs made of the substance being filtered. Such filtering equipment is shown, for example, in U.S. Pat. Nos. 3,471,017, 3,645,399, 3,856,674, 3,856,680 and 4,010,391.

The material forming the inlet seal in such filtering equipment eventually enters the filtering chamber and is ultimately incorporated into the product which is made from the filtrate. When materials are filtered which are sensitive to thermal history, this is disadvantageous in that the homogeneity of the product is affected since that part of the product which formed part of the seal will have undergone an added thermal cycle during the formation and the subsequent remelting of the seal. In addition, should a polymer color change be carried out during filtering (e.g. from black to clear transparent polymer) the previously formed inlet seal will have been made from the substance first filtered and will act as a contaminant when, during subsequent movements of the filter, the material comprising it is drawn into the filtering chamber then containing material of a different color.

SUMMARY OF THE INVENTION

It is an object of this invention to permit the use of such seals without the deleterious effects described by removing a part of the material forming the inlet seal before it enters the flow of filtered material leaving the filtering chamber to be incorporated into a product. Another object of the invention is to remelt a part of the inlet seal prior to its entry into the filtering chamber but without removing it before entry so as to bring about better melt homogeneity.

In a preferred form of the invention, a conventional inlet port is used but an additional chamber is provided between the inlet port and the filtering chamber, and the chamber is provided with heating and cooling means and with a polymer valve to permit removal of the seal material contained in the chamber when in a heat-softened state. Initially, the chamber contains a cooled, substantially rigid plug permeating the filter interstices and the clearances between filter assembly and the chamber walls, the plug being made of the polymer, such as Polyethylene, being filtered. The chamber contains no air and at this stage its contents are, in common with the rest of the inlet plug, solid and rigid enough to prevent the outward leakage of the high pressure material present in the filtering chamber. Subsequently, the chamber is heated so as to sufficiently soften the plug material to permit its displacement from the chamber by fresh, hot polymer situated within the filtering chamber, and the polymer valve is opened. When sufficient seal material has been replaced by fresh polymer so as to permit a predetermined incremental movement of the filter without spent seal material being carried into the filtering chamber with the filter, the polymer valve is closed and the filter is moved forward. Only polymer which has freshly entered from the filtering chamber re-enters the chamber with the filter so that contamination of the filtrate by plug material is avoided. Finally, the purging chamber and its contents are, advantageously, cooled again so as to avoid needless thermal deterioration within the chamber (this phase is not essential since the contents of the purging chamber will be subsequently removed, but it is good practice). It will be clear that it is not necessary to close the valve before filter movement commences but that an overlap can be provided where desired. Furthermore, heating of the purging chamber and the opening of the valve need not be simultaneous when a separate purging valve is provided; it will be clear, however, to those skilled in the art, that when substantially simultaneous operation is desired, the purge valve may be made integral with the purge chamber so that construction of the equipment is simplified.

When filters are moved forward in large increments in equipment constructed, for example, in accordance with the patents identified hereinabove, a further problem may arise in that the substantially solid inlet seal part entering with the filter may not melt in sufficient depth before parts of it leave the filtering chamber. This problem is particularly acute in the case of filter carrier plates having individually drilled, comparatively large perforations. When the semi-rigid polymer plug formed within such a hole is brought into registry with the filtrate outflow passage of the filtering chamber, it tends to leave the carrier plate well before full thermal equilibrium is reached within the plug and it eventually becomes an unwanted gel particle within the product. The purging process described above obviates this problem by removing the potential gel altogether. It will be clear that in those cases when color changes and adverse thermal history effects are not operative, it will suffice to provide a chamber situated between the inlet port and the filtering chamber and to preheat the chamber and its contents before the filter is moved forward so that the portion of the inlet sealing plug situated within the chamber melts fully before entry into the filtering chamber, but is not removed from the product being manufactured. Where such an option is desired, it has been found advantageous to provide the purging chamber with removable plugs which obstruct the exit channel or channels so that no stagnant regions are formed within the channels when the chamber is operated in this simplified manner.

An alternative method of removing the material of the inlet plug as it enters the filtering chamber takes advantage of the fact that the material tends to enter the filtrate collector channels of the filtering chamber at known locations adjoining the inlet port and at known times following filter movements. Polymer collecting channels are therefore provided in the filtering chamber itself adjoining the filter inlet port and provided with a suitable valve which permits bleeding-off of plug-forming material following its resoftening upon entry into the filtering chamber with the filter. Once the spent plug-forming material has been so removed, the valve may be used to redirect the flow of polymer from the said collector channels into the main flow of the filtrate so as to minimize the amount of wasted material.

BRIEF DESCRIPTION OF THE DRAWING

FIG. 1 is a sectional top-plan view of a preferred embodiment of the invention taken along the line III—III of FIG. 2, in the direction indicated generally;

FIG. 2 is a sectional side-elevational view thereof, taken along the line I—I of FIG. 1, in the direction indicated generally;

FIG. 3 is another sectional view thereof, taken along the line II—II of FIG. 1, in the direction indicated generally;

FIG. 4 illustrates an optional component usable as a part of the invention shown in FIG. 1;

FIG. 5 is a sectional view of an alternate embodiment of the invention;

FIG. 6 is a plan view of another embodiment of the invention; and

FIG. 7 is a sectional view of the embodiment shown in FIG. 6 taken along the line IV—IV of FIG. 6, in the direction indicated generally.

DESCRIPTION OF THE PREFERRED EMBODIMENTS

The embodiment of FIGS. 1 to 3 shows part of a filtering chamber 28 positioned within a filter body 1. In use, hot polymer flows through filter body 1 which is flanked by a filter inlet port of known construction consisting of three neighboring zones 2, 3, and 4 and a thermal polymer valve 5 communicating with zone 3, as described for example in U.S. Pat. No. 3,856,674. In addition, there is provided between said filtering chamber and inlet port an additional zone 6 which is provided with another thermal polymer valve 7.

Filters 8 and 9 separated by a corrugated backing support 10 are disposed within a transverse, generally H-shaped slot shown in FIG. 3. The H-shaped slot bisects the upstream filtering chamber (the backing support is removed for clarity in FIG. 3). Filters 8 and 9 and backing support 10 move, in use, in the direction of arrow a. Polymer passes within the filtering chamber through both filters 8 and 9 and into the interstices of backing support 10. The filtrate is extracted from the backing support through a multiplicity of vents 12 into collecting channels 13 and 14 through which it passes out of the apparatus. Filters 8 and 9 may each consist, for example, of one or more layers of woven stainless steel cloth or non-woven sintered metal cloth, while backing support 10 may consist of corrugated, flexible stainless steel.

Zones 2, 3 and 4 are provided with heaters 22, 23, 24, 25, 26 and 27. Zones 2 and 4 are provided with coolant channels 29, 30 and 31, 32. Thermal valve 5 receives molten polymer through passage 15 which, when water flow in supply pipes 19 and 20 is interrupted and electric cuff heater 21 is energized, enters the annular chamber 16, the top and bottom halves of which communicate via side passages 17 and 18. Zones 2 and 4 are cooled at this time and zone 3 is heated; polymer impregnates the interstices of the filters and backing support and the clearances provided between the backing support and the inlet port, and in this manner the inlet sealing plug, made of the polymer being filtered is replenished according to known art. Zone 4 is provided with adjustable locating bars 33, 34, the spacing of which is set to the thickness of filter assembly 8, 9, and 10.

A novel zone 6 is additionally provided between filtering chamber 28 and inner zone 2 equipped with cartridge heaters 36, 37 and coolant passages 38, 39 and also with a polymer valve which comprises thermal valve 7 carrying an electric cuff heater 41. Valve 7 has a coolant channel 43 communicating with pipes 42 and 44 through which coolant can be circulated. Valve 7 also has two polymer outflow passages 45 and 46. Passage 45 communicates with extraction orifice 49 via channel 47 and bore 48; passage 46 likewise communicates with extraction orifice 50 via channel 51 and bore 52. Passages 45 and 46 each terminate in a hollow, threaded, replaceable end tube, one of which is shown at 53.

Zone 6 contains in use only the filter assembly 8,9 and 10 and the polymer plug previously formed in zones 2, 3 and 4, and contains no air. When it is desired to bleed off the polymer forming the leading end of the inlet plug, preferably just preceding filter movement, zone 6 and valve 7 are heated and their water supplies are turned off. Valve 7 then opens and as that part of the inlet sealing plug which is situated within zone 6 softens, the polymer forming the plug exits through valve 7 via orifice 50, bore 52, channel 51, passage 46 and end tube 53 and likewise via orifice 49, bore 48, channel 47, passage 45 and its end tube. The plug is then replaced by fresh polymer entering the clearances provided above and below filters 8 and 9 at 54 and 55 respectively. It is found that, owing to thermal asymmetry or other causes, polymer flows in passages 45 and 46 are generally unequal and the threaded end tubes (such as 53) at which they terminate can be replaced with plugs having unequal bores so as to compensate for this effect.

Following the purging of spent plug material from zone 6, the filter is incrementally moved forward, the increment not exceeding the length of zone 6. During this time, zone 3 is kept hot enough to render the polymer in chamber 16 deformable. Zones 2 and 4 are either cooled or, if the polymer being filtered is highly adhesive like Nylon 66, they can be temporarily heated during filter movement sufficiently to detach the polymer plug within them from their inner surfaces, though not so much as to cause leakage through the seal.

It will be understood by those skilled in the art of polymer filtering that polymer valves other than the thermal valve shown at 7 may be employed (such as mechanically operated spool valves for example), and that the time schedule of actuating the bleed valve and heating zone 6 can be freely chosen so as to suit the polymer being filtered. When thermally tolerant polymers, such as Polyethylene, are filtered in apparatus according to the invention, then the two end plugs such as 53 can be fitted directly into the lower ends of bores 48 and 52. Bores 48 and 52 are, in this case, brought through the wall of zone 6, channels 47 and 51 and valve 7 being omitted so that in this case zone 6 not only provides an extraction chamber but part of the lower half of zone 6 also acts as the polymer valve. Between filter movements, and particularly when long standby periods occur, all four zones 2, 3, 4 and 6 as well as valves 5 and 7 are advantageously cooled so as to prevent thermal degradation; even though the material forming the inlet plug is progressively removed at its leading end as described (at substantially the same overall rate as it is reformed within zone 3) it is good practice to minimize thermal damage nonetheless. The amount of polymer which is removed at a time is substantially that contained in zone 6.

It will be understood by those skilled in the art of polymer filtering that when well-stabilized polymers are filtered which exhibit no material thermal degradation upon sealing plug formation and subsequent remelting but are nonetheless prone to gel formation if the inlet sealing plug softens and is carried out of the filtering chamber prematurely, then zone 6 may be used as a preheating zone within which the leading end of the inlet plug can be heated prior to filter forwarding until thermal equilibrium has been reached in depth. In this case no polymer needs to be bled from zone 6 and two keys, one of which, key 35 is shown in FIG. 4, can be inserted into orifices 49 and 50 respectively so as to block them and avoid stagnant pockets of polymer being formed within them.

FIG. 5 shows another embodiment of the invention applied to progressively remove the inlet plug, made of the polymer being filtered, utilized in polymer filtering apparatus of the kind described in U.S. Pat. No. 3,856,680. Filtering chamber 60 within body 61 is bisected by a perforated backing plate 62 carrying filter strip 63 and the filter assembly is supported within chamber 60 by a breaker plate 64 slotted in the direction of filter movement according to known art. The backing plate and filter strip move in the direction of arrow b. According to the invention described herein, there is provided a slide valve 68 penetrating body 61 which has a bore 70 which communicates with an elongated chamber 69 extending below and across backing plate 62 and, in the position of valve 68 shown, communicates also with passage 72. Inlet port 65, cooled by coolant carrying channels 66 and 67, forms an inlet sealing plug made from the polymer being filtered within the interstices and around filter assembly 62 and 63. Upon entering the heated body 61 with the filter assembly, the leading end of the plug is remelted and, with the slide valve 68 being in the position shown, the material comprising it exits filter body 61 through passage 72. Slide valve 68 is then moved in the direction of arrow c until bore 70 communicates with passage 71 so that through this passage fresh, filtered polymer flows into the lower, downstream half of chamber 60 from chamber 69. This sequence is repeated every time the filter assembly 62, 63 is moved so that the passage of not fully molten polymer from the apertures of backing plate 62 into the product is thereby prevented. Only a small amount of polymer, equal to that contained within the filter assembly, needs to be periodically bled off to avoid gel formation.

The invention described herein may be applied to filtering apparatus according to U.S. Pat. No. 3,471,017 as shown in FIGS. 6 and 7. (In FIG. 6, the filter is removed for clarity). A rectangular breaker plate 80 is utilized to support filter 83. Filter 83 is moved in the direction of arrow d. Holes comprising the first line of holes in breaker plate 80, those nearest to the inlet port, are blind and communicate not with the downstream part 81 of the filtering chamber but with chamber 82 which is, in turn, provided with a slide valve and associated passages (not shown) in the manner described in conjunction with FIG. 5. In this way inlet plug parts carried in with the filter supported upon breaker plate 80, and indeed other contaminants which may be carried into the filtering chamber by a filter inadequately cleaned prior to use, are removed from the flow of filtered polymer from which a high-purity product can be subsequently made.

It will be clear that breaker plates with configurations other than rectangular may also be readily constructed in accordance with the above teachings; for example in the case of a circular breaker plate having a concentric pattern of holes, those holes situated along the half-periphery nearest to the inlet port would be drilled blind and communicating with a chamber analogous to chamber 82.

Other minor variations in the structure and arrangement and size of the various parts may occur to those skilled in the art without departing from the spirit or circumventing the scope of the invention as set forth in the appended claims.

I claim:

1. In a filtering process in which a filter is moved through an inlet port into a filtering passage containing a substance which is passed through the filter and the inlet port is sealed by a plug of the substance being filtered by controlling the temperature conditions in the inlet port, the improvement comprising, heating the substance which occupies that part of the inlet port adjacent the filtering passage so as to be substantially fully molten thereby providing melt homogeneity before passing into the passage upon movement of the filter, while sealing is maintained by at least some of the remaining substance in the inlet port.

2. In a filtering process in which a filter is moved through an inlet port into a filtering passage containing a substance which is passed through the filter and the inlet port is sealed by a plug of the substance being filtered by controlling the temperature conditions in the inlet port, the improvement comprising, heating the substance which occupies that part of the inlet port adjacent the filtering passage sufficiently to soften the substance and bleeding away the softened substance from the filter so as to prevent it from joining the main body of the substance being filtered on continued movement of the filter while sealing is maintained by at least some of the remaining substance in the inlet port.

3. A process as claimed in claim 2 in which the substance to be bled away is heated while in the inlet port.

4. A process as claimed in claim 3 or 1 in which substance occupying the part of the inlet port adjacent the filtering passage is subsequently cooled after movement of the filter.

5. A process as claimed in claim 2 in which the substance to be bled away is passed from the inlet port to meet part of the body of the substance being filtered, where it is heated.

6. A process as claimed in claim 2, 3 or 5 in which a valve is used to control flow of the substance to be bled away.

7. A process as claimed in claim 2, 3 or 5 in which the substance forming the sealing plug is the substance being filtered.

8. A process as claimed in claim 7 in which fresh substance is introduced into the inlet port from the body of the substance to be filtered.

9. A process as claimed in claim 2, 3 or 5 in which the filter is moved in increments which correspond to the quantity of substance in the inlet port which is bled away.

10. In a filtering apparatus including a filtering passage, an inlet port through which a filter can be passed into the passage and heating means controlling the temperature conditions in the inlet port to enable the formation of a sealing plug of the substance to be filtered in the passage, the improvement comprising, a bleed passage to permit the removal of substance which occupies part of the inlet port adjacent the filtering passage, and means to selectively open or close the passage.

11. Apparatus as claimed in claim 10 in which the bleed passage communicates with part of the inlet port, which part is provided with means for heating substance present therein.

12. Apparatus as claimed in claim 11 in which the said part of the inlet port is provided with cooling means.

13. Apparatus as claimed in claim 12 in which the heating and cooling means in the said part of the inlet port are operable to selectively open or close the bleed passage by means of the substance in the inlet port.

14. Apparatus as claimed in claim 10 in which the bleed passage communicates with the filtering passage so as to receive substance after it has passed from the inlet port on movement of the filter.

15. Apparatus as claimed in claim 14 in which the bleed passage communicates with substance downstream of the filter.

16. Apparatus as claimed in claim 15 in which the bleed passage is formed on the inlet port side of an apertured breaker plate for supporting the filter in the passage.

17. Apparatus as claimed in claim 15 or 16 in which the means for selectively opening or closing the bleed passage include a valve for directing substance into the main flow of filtered substance when the bleed passage is closed.

18. Apparatus as claimed in any of claims 10, 11 or 14 in which the means for selectively opening or closing the bleed passage is a valve provided with means for heating and cooling the substance flowing through it.

19. Apparatus as claimed in any of claims 10, 11 or 14 in which the means for selectively opening or closing the bleed passage is a mechanical valve.

20. In an inlet port for use in filtering apparatus in which a filter is passed through the port into a filtering passage and the temperature conditions in the port are controlled to form a sealing plug of the substance to be filtered or of another substance, the inlet port including a first zone provided with heating and cooling means remote from the filtering passage and a second zone provided with heating means adjacent the filtering passage, the improvement comprising, means for introducing sealing plug forming substance into the inlet port between the first and second zones, and a bleed passage communicating with the second zone.

21. An inlet port as claimed in claim 20 in which the bleed passage is provided with a valve.

22. An inlet port as claimed in claim 20 or 21 including means for blanking off the bleed passage inside the second zone.

23. An inlet port as claimed in claim 20 in which the means for introducing plug forming substance comprises a passage communicating with a third zone of the inlet port provided with heating means.

24. An inlet port as claimed in claim 23 in which a fourth zone is provided between the second and third zones, the fourth zone having heating and cooling means.

25. An inlet port as claimed in claim 23 or 24 in which the passage communicating with the third zone is connected through a valve to a passage communicable with the filtering passage of apparatus in which the inlet port is to be used.

26. An inlet port as claimed in any of claims 20 or 21 in which the second zone is provided with cooling means.

* * * * *